Dec. 4, 1928.
S. D. PADDACK ET AL
1,693,936
TAIL LIGHT AND DANGER SIGNAL
Original Filed Nov. 3, 1923    2 Sheets-Sheet 1
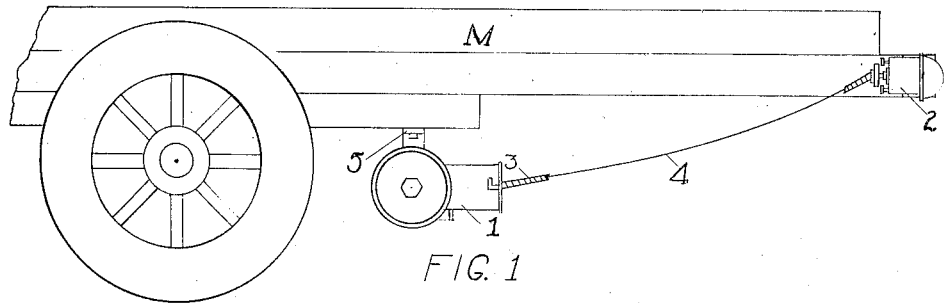
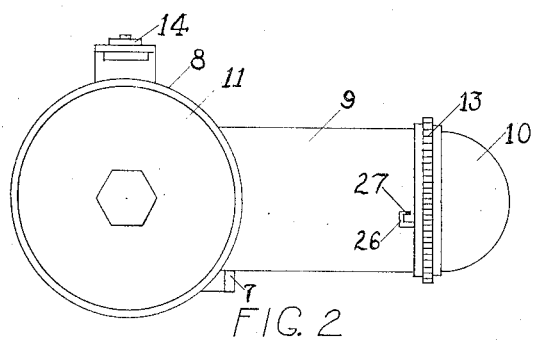
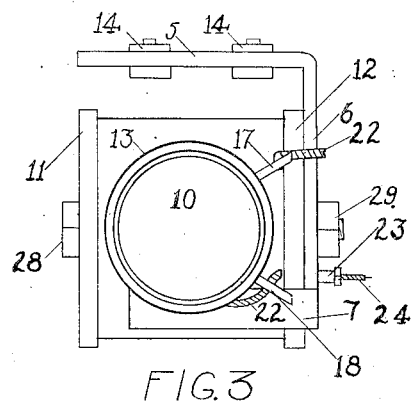
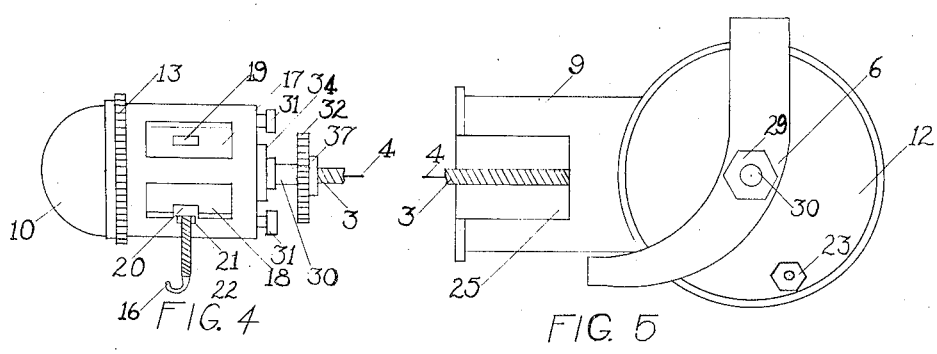
S.D. PADDACK
AND
C.G. WILFORD
INVENTORS
BY Fred H Hayn
ATTORNEY.

Dec. 4, 1928.
S. D. PADDACK ET AL
1,693,936
TAIL LIGHT AND DANGER SIGNAL
Original Filed Nov. 3, 1923  2 Sheets-Sheet 2
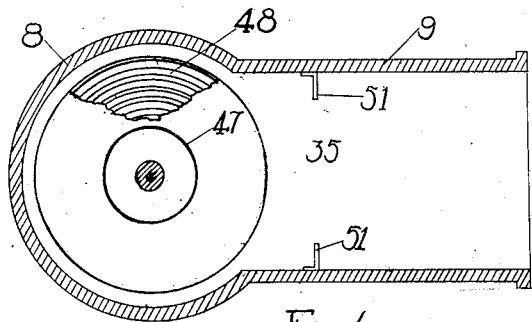
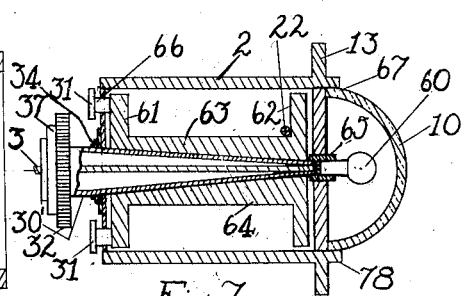
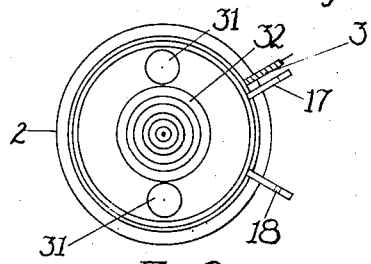
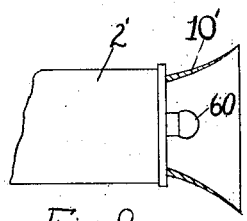
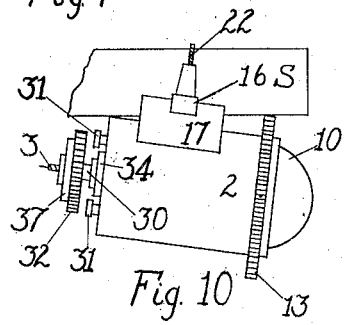
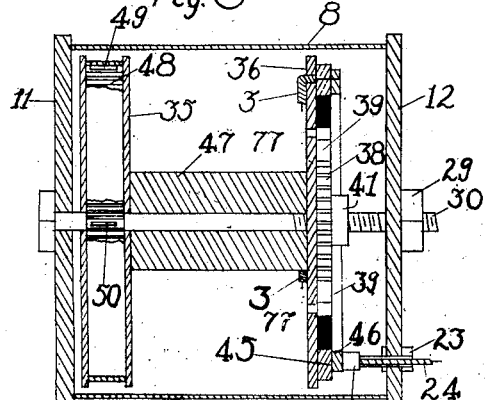
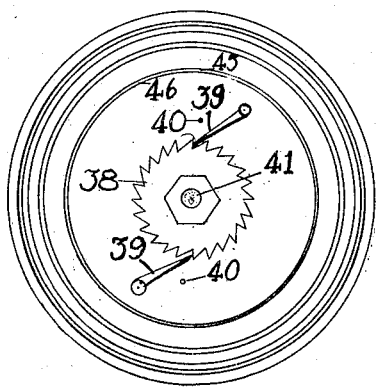
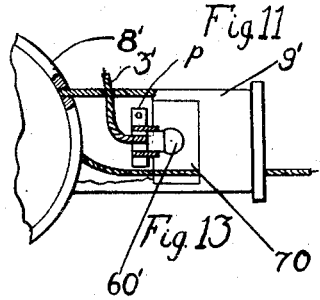
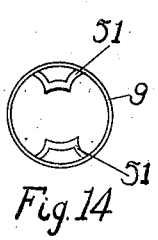
S.D. PADDACK
C.G. WILFORD
INVENTORS
BY Fred H. Hayn
ATTORNEY.

Patented Dec. 4, 1928.

1,693,936

UNITED STATES PATENT OFFICE.

SIMON D. PADDACK AND CHARLES G. WILFORD, OF LOS ANGELES, CALIFORNIA, ASSIGNORS, BY MESNE ASSIGNMENTS, TO GEORGE D. JOHNSON, OF LOS ANGELES, CALIFORNIA.

TAIL LIGHT AND DANGER SIGNAL.

Application filed November 3, 1923, Serial No. 672,524. Renewed December 10, 1926.

This invention relates to improvements in signals, and more specifically to a tail light and danger signal adapted to be applied to the rear end of a motor or other vehicle.

City ordinances require that a motor or other vehicle be provided at its rear end with a signal when operated at night, said signal comprising a red light and a white light, when placed upon a motor vehicle, in order that the license plate may be visible; said ordinances also require that when a motor vehicle is provided with a trailer a similar signal be placed on the rear end of said trailer.

The customary red light displayed at night on a motor vehicle does not answer the requirement that a trailer or a load extending from a motor truck or other vehicle be provided with a red light.

The present invention has for an object to provide a signal or tail lamp which may comply with all of the above requirements; and which is adjustable or extensible for positioning upon the rear end of a vehicle in the usual manner, or which may be extended for attachment to the rear end of a projecting load on the vehicle, or to the rear end of a trailer or the like.

Another object is to provide an extensible tail lamp which may be easily attached in any suitable position to a vehicle, which is simple in construction, inexpensive to manufacture and market, and which complies with all of the laws regulating tail lights.

A further object of the invention is to provide a tail lamp for vehicles with means for easily attaching the lamp directly upon the load or on the trailer at the rear thereof; with a permanently attached casing on the vehicle and a detachable lamp portion connected to the casing by a flexible and extensible electric cable admitting removal of the lamp portion and mounting of the same at a distance from the casing; and with means for locking the parts together when assembled in the casing.

The above and various other objects and advantages of this invention will in part be brought out in, and in part be understood from the following detailed description of the present preferred embodiment, the same being illustrated in the accompanying drawings, wherein like numerals of reference refer to like parts throughout the several views, and wherein:—

Figure 1 is a fragmentary side elevation of a vehicle equipped with a tail lamp constructed according to the present invention.

Figure 2 is a side elevation of the tail lamp assembled for ordinary use on a vehicle.

Figure 3 is an outer end elevation of the same.

Figure 4 is a detail side elevation of the lamp section removed from the casing.

Figure 5 is a detail side elevation of the casing with the lamp section removed.

Figure 6 is an enlarged vertical section taken longitudinally through the casing.

Figure 7 is a similar view taken through the lamp section.

Figure 8 is an inner end view of the lamp section.

Figure 9 is a fragmentary outer end view, partly in section of the lamp section, showing a modified form thereof.

Figure 10 is a top plan view of the lamp section extended and attached to the rear end of a load.

Figure 11 is an enlarged transverse section of the inner end of the casing.

Figure 12 is a detail end view of the drum shown in Figure 11.

Figure 13 is a fragmentary side elevation, partly in section, of a modified form of the device, and Figure 14 is a transverse section through the intermediate portion of the casing.

Referring to the drawings, 1 designates a casing for permanent installation upon the rear end of a motor vehicle, and 2 designates a lamp section removably fitting in the outer end of the casing 1 and held therein by a pin 27 on the lamp section 2 entering a bayonet slot 26 provided in the side wall of the casing 1.

The casing 1 has a cylindrical body part 9 carrying upon its inner end a transversely extending spool housing 8. The housing 8 is closed at opposite ends by detachable caps 11 and 12 held in place by an axially disposed bolt 30 having a head 28 on one end and a nut 29 on its other end.

A bracket 6, Figures 1, 2, 3 and 5, is mounted on one end of the bolt 30 against the head 12 of the spool housing 8, and has its lower end curved forwardly and bent transversely beneath the cylindrical body 9 to provide an arm 7 for supporting the casing 1. The upper end of the bracket 6 is also bent transversely to provide an attaching arm 5 overhanging the spool housing 8 and adapted for attachment to a vehicle M by means of bolts 14 or the like.

The housing 8 carries therein a spool 47 mounted on the bolt 30, serving as a shaft for the spool, and the spool 47 has heads 35 and 36 on opposite ends. The head 35, as shown in Figure 11, is hollow and contains a coil spring 48 which has its inner end 50 secured to the bolt or shaft 30 and its outer end 49 secured to the head 35. A nut 41 is threaded on the intermediate portion of the shaft 30 and bears against the head 36 to hold it against the spool 47. The head 36 carries on its outer side an insulating ring 45 upon which is mounted a contact ring 46 of copper or the like and against which a brush 44 wipes, the brush 44 being carried on a wire 24 extending through a bushing 23 in the head 12 of the spool housing 8.

A wire 4 is attached to the spool head 36 and is connected to the contact ring 46. A flexible metallic covering 3 protects the wire 4, and the protected wire is removably wound on the spool 47 and has its free end carried forwardly from the housing 8 into the cylindrical body 9 for attachment to the removable lamp section 2.

The shaft 30 carries a ratchet wheel 38 which lies adjacent the outer side of the spool head 36, and which is engaged by pawls 38 carried by the head 36, the pawls having pivot pins 77 secured in the head 37. Stop pins 40 are also carried by the head 36 to limit the outward swinging of the pawls 39.

The cylindrical body 9 of the casing is provided with a longitudinal slot 25 in one side which opens through the outer end of the body 9 to receive a pair of diverging finger pieces 17 and 18 which project from one side of the lamp section 2. Stops 51 on the inner side of the body 9 limit the inward movement of the lamp section 2.

The lamp section 2 has a cylindrical casing for frictional engagement in the body 9, and is provided with a knurled flange 13 to facilitate positioning and withdrawal of the lamp section 2 in and from the main casing 1, and for otherwise handling the lamp section 2. The outer end of the lamp section is closed by a disc 67 and the inner end thereof is closed by a disc 66, the discs 66 and 67 being permanently or otherwise suitably secured to the opposite ends of the lamp casing 2. A lamp socket 65 is fitted through the disc 67 and carries a lamp 60 at the outer side of the disc 67, the lamp 60 being enclosed in a transparent dome or enclosing lens 10 of red or other suitably colored glass, or the like. The dome 10 is secured to the lamp casing 2 by an overhanging flange 78 on the forward end of the casing 2.

The lamp casing 2 has a substantially cone-shape spindle 30′ removably positioned axially in the casing 2 with the apex portion terminating in the back end of the lamp socket 65 to house the electric cord 3 which leads to the socket 65 from the fixed casing 8.

The spindle 30′ extends rearwardly through the disc 66 and through a ring or bearing 34 carried thereby. The spool 63 has flanges 61 and 62 for confining the coils of an attaching cord 22 on the spool. Knobs 31 carried through the disc 66 engage the flange 61 to free the spool 63 from the tapering spindle 30′ when it is desired to free the attaching cord 22 and to turn the spool 63 when the cord 22 is to be wound thereon. A knurled flange 32 is carried on the rear end of the spindle 30′ to turn the same and to wedge the spindle 30′ forwardly into the lamp socket 65; locking the spool 63 from turning in the casing. The attaching cord 22 is to encircle or bind about a part of the motor vehicle or its load S, Figure 10, and secure the removable lamp casing in desired position when removed from its stationary casing 1.

The arm or flange 18 has a notch 20 therein to receive the cord 22 and hold the latter in place, and the arm or flange 17 has an opening or slot 19 therein to receive a hook 16 carried by the cord 22, as shown in Figures 4 and 10. When the thumb piece 32 is forced forwardly the spindle 30′ moves axially in the spool 63 and into the lamp socket 65, binding or wedging in both the spool and socket. Pulling the thumb piece 32 backwardly a slight distance removes the small forward end of the spindle from the lamp socket and frees the spindle to turn in the casing. Instead of employing the lens 10 shown in Figure 7, a flaring deflector 10′ may be used about the lamp 60 as shown in Figure 9.

If desired the stationary casing 9′, Figure 13, may have a permanent light bulb 60′ therein on a bracket opposite a slot or opening 70 in the side of the casing 9′, and which is supplied with current through a wire 3′.

What is claimed is:—

1. A combined tail light and danger signal comprising a stationary casing, a reeled extension electric conducting wire mounted in the casing, an extension casing detachably connected to the stationary casing, a lamp carried in the extension casing and connected to said reeled wire, said extension casing adapted to be disconnected from the stationary casing and said reeled wire adapted to pay-out to admit the positioning of the extension casing at a point remote from the stationary casing, and a reeled attaching cord carried in the extension casing adapted to engage a support for maintaining the extension casing at a desired point.

2. A combined tail light and danger signal comprising a stationary casing, a reeled electric wire in said casing, an extension casing detachably fitting in the stationary casing and having a lamp therein connected to said wire, and a reeled attaching cord carried in the extension casing for engaging a support remote from the stationary casing, said extension casing adapted to be removed from the stationary casing and said reeled wire adapted to pay-out and admit positioning of the extension casing at a point remote from the stationary casing.

3. A combined tail light and danger signal comprising a stationary casing, a reeled conducting wire in said stationary casing, an extension casing removably connected to the stationary casing and having a lamp therein connected to said conducting wire, said extension casing adapted to be removed from the stationary casing and positioned remotely therefrom and said wire adapted to pay-out to energize the lamp in adjusted position of the extension casing, a reel mounted in the extension casing, an attaching cord mounted on the reel for engaging a support to secure the extension casing thereto, and securing and releasing means for said reel to hold the attaching cord upon the support when adjusted.

4. A combined tail light and danger signal comprising separable stationary and extension members, an extensible electric connection between said members to admit adjustment of the extension member at a point remote from the stationary member, an attaching device carried by the extension member for engaging a support to hold the extension member thereto, means for releasing the attaching member for adjustment to the support, and means operable upon the attaching member for holding the same in position of adjustment.

5. In a combined tail light and danger signal, separable stationary and extension members, an electric connection carried in one of the members and connected to the other and being extensible between the members to admit positioning of the extension member at a point remote from the stationary member, a lamp in the extension member secured to said electric connection, an attaching cord reeled within the extension member, means for releasing the cord in the extension member to admit application of the cord to a support and removal of the cord therefrom, and means in the extension member for securing the cord when adjusted to hold the extension member to the support.

6. A combined tail light and danger signal comprising a casing for attachment to the rear end of a vehicle, a reeled electric wire mounted in the casing and adapted to be extended therefrom, an extension casing removably interlocked in the stationary casing and having a lamp connected to said reeled wire and adapted to be positioned remotely from the stationary casing to position the lamp remotely from the stationary casing, a reel mounted in the extension casing, a tapering spindle in the extension casing supporting said reel and adapted for axial movement to bind in the reel and in the casing for locking the reel and the spindle from turning therein, an attaching cord carried by said reel adapted to be payed-out to engage a support to secure the extension casing in adjusted position, and means for rewinding the cord on the reel when released from said spindle.

7. A tail piece for a tail light and danger signal, a casing, a bracket attached to said casing for supporting the same, said bracket consisting of a vertical portion and two end portions, one of said end portions being bent above the casing, the other of said bent portions being bent below said casing, one of said bent portions being adapted to be attached to a support, the other of said bent portions extending below said casing and adapted to assist in supporting said casing in position, substantially as described.

SIMON D. PADDACK.
CHARLES G. WILFORD.